US007268317B2

(12) United States Patent
Tenaglia et al.

(10) Patent No.: US 7,268,317 B2
(45) Date of Patent: Sep. 11, 2007

(54) LASER PEENING PROCESS AND APPARATUS USING A LIQUID EROSION-RESISTANT OPAQUE OVERLAY COATING

(75) Inventors: Richard D. Tenaglia, Columbus, OH (US); Jeff L. Dulaney, Dublin, OH (US); David F. Lahrman, Powell, OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 10/654,369

(22) Filed: Sep. 2, 2003

(65) Prior Publication Data

US 2005/0045607 A1 Mar. 3, 2005

(51) Int. Cl.
*B23K 26/00* (2006.01)

(52) U.S. Cl. ................................................ 219/121.85

(58) Field of Classification Search ........... 219/121.85, 219/121.6, 121.86; 427/554; 148/508, 525
See application file for complete search history.

(56) References Cited

U.S. PATENT DOCUMENTS 3,850,698 A * 11/1974 Mallozzi et al. ............ 148/525
5,741,559 A * 4/1998 Dulaney ..................... 427/554
6,057,003 A * 5/2000 Dulaney et al. ............ 427/457
6,064,035 A * 5/2000 Toller et al. ........... 219/121.86
6,254,703 B1 * 7/2001 Sokol et al. ................ 148/508
6,292,584 B1 * 9/2001 Dulaney et al. ............ 382/151
6,500,269 B2 * 12/2002 Risbeck et al. ................ 134/1
6,548,782 B2 * 4/2003 Dykes et al. .......... 219/121.85

* cited by examiner

*Primary Examiner*—Geoffrey S. Evans
(74) *Attorney, Agent, or Firm*—Randall J. Knuth

(57) ABSTRACT

The invention relates to a method and apparatus for improving properties of a solid material by providing shockwaves there through. Laser shock processing is used to provide the shockwaves. The method includes applying a liquid energy-absorbing overlay, which is resistant to erosion and dissolution by the transparent water overlay and which is resistant to drying to a portion of the surface of the solid material and then applying a transparent overlay to the coated portion of the solid material. A pulse of coherent laser energy is directed to the coated portion of the solid material to create a shockwave. Advantageously, at least a portion of the unspent energy-absorbing overlay can be reused in situ at a further laser treatment location and/or recovered for later use.

27 Claims, 2 Drawing Sheets

10
26
39
37
20
12
16
14
18
20
24
22
50

LASER PEENING PROCESS AND APPARATUS USING A LIQUID EROSION-RESISTANT OPAQUE OVERLAY COATING

BACKGROUND OF THE INVENTION

1. Field of the Invention

The present invention relates to the use of coherent energy pulses, as from high power pulsed lasers, in the shock processing of solid materials, and, more particularly, to methods and apparatus for improving properties of solid materials by providing shockwaves therein. The invention is especially useful for enhancing or creating desired physical properties such as high cycle fatigue life, fretting fatigue life, hardness, strength, and fatigue strength.

2. Description of the Related Art

Old methods for the shock processing of solid materials typically involve the use of high explosive materials in contact with the solid, high explosive materials or high pressure gases used to accelerate a plate that strikes the solid to produce shockwaves therein. Such methods have several disadvantages. For example: (a) it is difficult and costly to shock process non-planar surfaces and complicated geometries, (b) storage and handling of the high explosive materials and high pressure gases pose a hazard, (c) the processes are difficult to automate and thus fail to meet some industrial needs and (d) high explosive materials and high pressure gases cannot be used in extreme environments such as high temperatures and high vacuum.

Shot peening is another widely known and accepted process for improving the fatigue, hardness, and corrosion resistance properties of materials by impact treatment of their surfaces. In shot peening, many small shot or beads are thrown at high speed against the surface of a material. However, the depth of treatment using conventional shot peening is typically only 0.004 to 0.006 inches deep. This depth is only 10–20 percent as deep as achieved with laser peening, and the surface enhancement of material properties with shot peening is much less effective.

Laser shock processing with coherent radiation has several advantages over what has been done before. For example, the source of the radiation is highly controllable and reproducible. The radiation is easily focused on preselected surface areas and the operating conditions are easily changed. This allows flexibility in the desired shocking pressure and careful control over the workpiece area to be shocked. Workpieces immersed in hostile environments, such as high temperature and high vacuum can be shock processed. Additionally, it is easy to shock the workpiece repetitively. This is desirable where it is possible to enhance material properties in a stepwise fashion. Shocking the workpiece several times at low pressures can avoid gross deformation, cracking, and spallation of the workpiece while non-planar workpieces can be shock processed without the need of elaborate and costly shock focusing schemes.

Laser peening (hereinafter referred to as laser shock processing) utilizes two overlays: a transparent overlay (usually water) and an opaque overlay, previously an oil based or acrylic based black paint. Tapes, such as black polyvinyl chloride or polyethylene tapes, have also been used successfully as the opaque overlay. During processing, a laser beam is directed to pass through the water overlay and is absorbed by the opaque overlay (black paint or tape), causing a rapid vaporization of the opaque overlay surface and the generation of a high-amplitude shockwave. The shockwave cold works the surface of the part as it propagates into the material and creates compressive residual stresses, which provide an increase in fatigue properties of the part. A workpiece is typically processed by processing a matrix of overlapping spots that cover the fatigue critical zone of the part.

The current laser processing of workpieces requires multiple re-applications of the opaque overlay, which require that the workpiece be manually removed from the laser processing station and recoated after several non-adjacent spots have been processed. When using paint, the old paint is sometimes removed before repainting the part or sometimes additional paint is simply added over the old paint. The repainting can require upwards of 12 to 15 paint cycles. Each cycle usually requires 15–20 minutes before the part can be returned to the processing station. This additional handling of the part for repainting will add as much as 50% to the cost of the processing in a production environment. In a similar manner, re-application of tape to overcome the problem of tape damage from the laser shot during processing adds significantly to the processing time and cost.

Other drawbacks have been found to be associated with using paints, both oil-based and water-based ones. These drawbacks stem from the need to dry paint prior to use thereof. Such drying adds to the process cycle time and/or increases system requirements in order to promote faster drying times. Furthermore, in the case of water-based paints, the paint can be rewet by the transparent overlay, such as flowing water, and may be eroded from the surface of the part before the laser beam is applied to the part. The removal of oil-based paints, not dissolved by a water overlay, must be achieved chemically and/or physically in a manner that essentially dissolves the paint or results in the flaking thereof. Additionally, there is no potential of relocating unused dried paint, in situ, to a new location where it may be used so as to reduce the total amount of paint to be applied. As such, recycling and/or reuse of paints is not practical, given typical removal methods.

A method of automatically applying the overlays in sequence with the laser system has been developed into an applicator system. This applicator system has, when used with the laser peening system, reduced the time of applying the overlay coatings and increased the throughput of the laser peen process. The opaque overlays used tend to be eroded by the transparent overlay during processing and have resulted in the generation of a weaker shockwave than achieved with tape or dry paint.

What is needed in the art is a laser shock process that utilizes an opaque overlay that does not have to dry, will not be eroded by the transparent overlay and yet allows for the generation of a strong shockwave that can be applied with the applicator system.

SUMMARY OF THE INVENTION

The present invention provides a method of laser shock processing that can be used in a production environment that significantly reduces processing time. The method includes the steps of coating the workpiece to be laser shock processed with a layer of a liquid opaque overlay coating that is resistant to erosion or dissolution by the transparent water overlay and that is resistant to drying. The liquid overlay coating is applied to a small area at least about 2 to 3 times the diameter of the laser beam. A transparent overlay, such as water, is applied forming a thin flowing layer over the previously coated portion. When the water has totally cov ered the coated portion, the laser is fired directly through the flowing water overlay and onto the coated area. The entire sequence and event timing is controlled by a preprogrammed microprocessor such as found in a personal computer. The sequences are repeated for each spot to be processed along the workpiece surface.

The invention comprises, in one form thereof, a method of improving properties of a solid material by providing shockwaves therein. An energy-absorbing coating that is resistant to dissolution by the transparent water overlay and resistant to drying is applied to a portion of the surface of the solid material. A transparent overlay material is then applied to the coated portion of the solid material. A pulse of coherent energy is then directed to the coated portion of the solid material to create a shockwave.

The invention comprises, in another form thereof, a method of improving properties of a solid material by providing shockwaves therein. An energy-absorbing coating that is resistant to dissolution by the transparent water overlay and resistant to drying is applied to a portion of the surface of the solid material. A transparent water overlay is then applied to the coated portion of the solid material. A pulse of coherent energy is then directed to the coated portion of the solid material to create a shockwave. An unspent portion of the energy-absorbing coating is displaced by the shockwave into at least one adjacent treatment location, effectively allowing in situ reuse of that unspent portion.

The invention comprises, in yet another form thereof, an apparatus for improving properties of a workpiece by providing shockwaves therein. The apparatus includes a material applicator for applying an energy-absorbing material on to the workpiece to create a coated portion and a transparent overlay applicator for applying a liquid transparent overlay to the workpiece over said coated portion. A laser is operatively associated with the transparent overlay applicator to provide a laser beam through the liquid transparent overlay to create a shockwave on the workpiece. A positioning mechanism is included to selectively position the workpiece relative to the material applicator, the transparent overlay applicator and the laser. Conversely, the positioning mechanism may position the material applicator and transparent overlay applicator correctly over the spot on the workpiece to be treated while it is in position in the laser beam path. A control unit is operatively associated with each of the applicators, laser, and positioning mechanism, to control the operation and timing of each of the applicators, laser, and the selective operation of the positioning mechanism.

The invention comprises, in yet a further form thereof, an energy-absorbing overlay for use in conjunction with a laser-induced shock process. The energy-absorbing overlay includes a base material, which is resistant to erosion or dissolution by the transparent water overlay and resistant to drying, and at least one energy-absorbing particulate dispersed within the base material. Advantageously, the base material is an oil, and the particulate material is colloidal graphite and/or fine black iron oxide ($Fe_2O_3$).

An advantage of the present invention is that the method allows the use of energy-absorbing coating that is viscous, adherent, and resistant to drying and that lends itself to reuse/recycling. Prior laser painting processes utilized oil, water or acrylic based paints that needed to be dried prior to use and that did not lend themselves to reuse and/or recycling.

Another advantage of the present invention is that the energy-absorbing coating that has an appropriate viscosity that allows it to both conform to a workpiece shape under substantially static conditions and be readily displaced under sufficiently dynamic conditions. Alternately, the energy-absorbing material can be chosen so as to be self-limiting with respect to its thickness, thereby improving thickness uniformity and reducing the need for thickness control measures.

Yet another advantage of the present invention is that since the energy-absorbing coating (both the viscous and self-limiting thickness versions) is resistant to drying and is typically oil based (i.e., lubricant as base), such a coating material will not tend to stop up an applicator, either during use or after an extended period of stagnation therewith in. The use of extremely fine or colloidal particulate prevents clogging of the applicator and prevents problems with settling during storage or processing. The non-drying feature permits the pre-application of the energy-absorbing coating. This pre-application can reduce the time and amount of spraying needed to be done in the processing cell and can limit the opportunity of applying a laser pulse to an uncoated area.

A further advantage of the present invention is the utilization of a flowing, transparent water overlay for processing of the workpiece surface. The use of the flowing water covers the coated area uniformly while additionally ensuring that any heat possibly transferred to the workpiece by the process will be removed.

Yet a further advantage of the present invention is that the process eliminates the need to move the workpiece from workstation to workstation as was previously accomplished and necessitated. The laser shock processing system now can be adapted to manufacturing process workloads and requirements.

A yet additional advantage of the present invention is that the applicator(s) in the coating system can be fitted with integral protectors that can preclude unwanted spraying of selected workpiece portions and/or selected process apparatus components, thereby both eliminating the need to manually mask such selected portions/components and reducing clean-up time.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
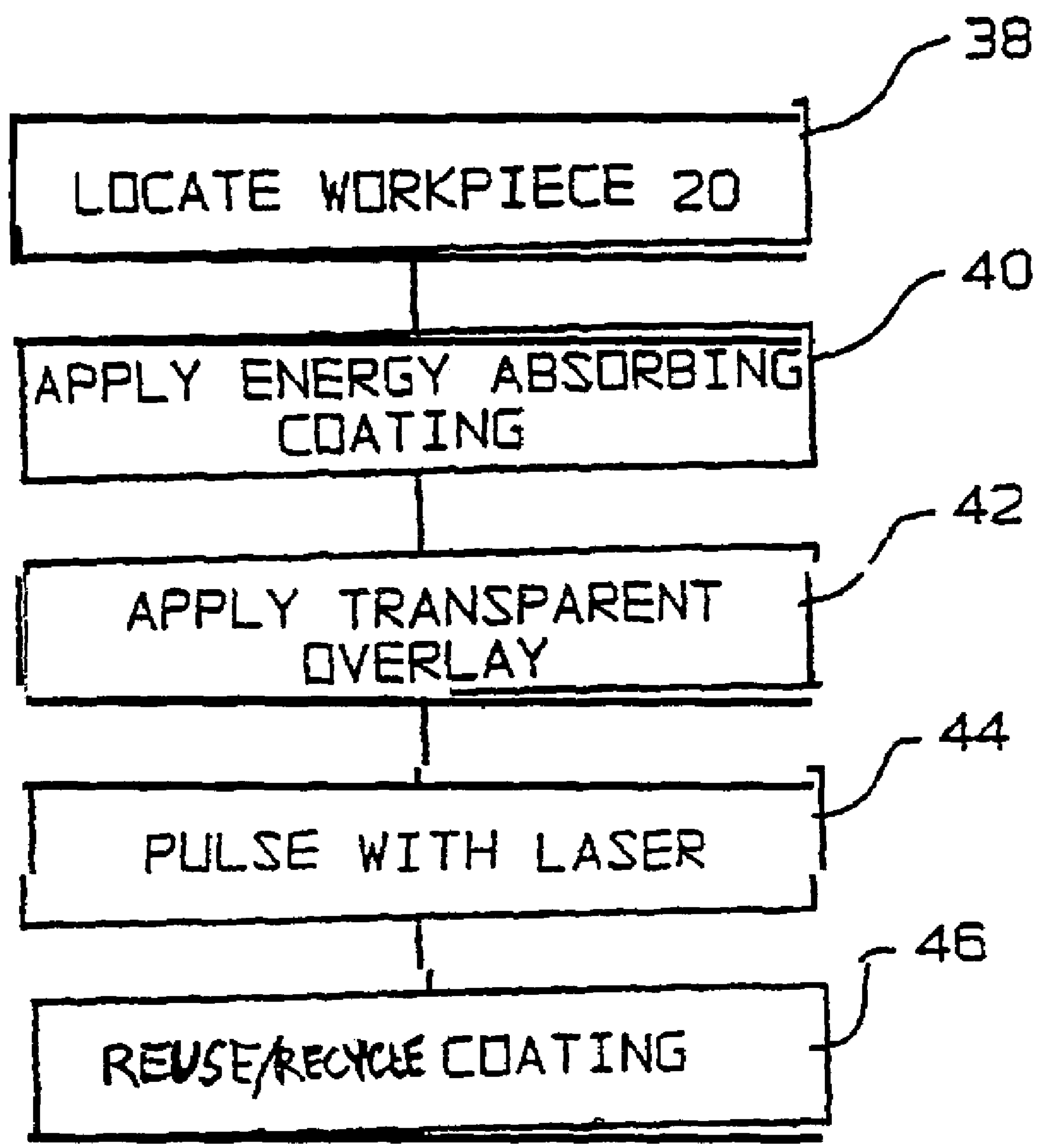
FIG. 1 is a flow chart of the method of the present invention

The improvements in fatigue life produced by laser shock processing are the results of residual compressive stresses developed in the irradiated surface that retard fatigue crack initiation and/or slow the crack propagation rate. A crack front is the leading edge of a crack as it propagates through a solid material. Changes in the shape of a crack front and slowing of the crack growth rate when the crack front encounters the laser shock zone in a laser shock processing condition have been shown.

Laser shock processing is an effective method of increasing fatigue life in metals by treating fatigue critical regions. As to what effect the tensile residual stresses surrounding the laser shocked region would have on crack initiation, a previous study is described in "Shockwaves and High Strained Rate Phenomena in Metals" by A. H. Clauer, J. H. Holbrook and B. P. Fairand, ed. by M. S. Meyers and L. E. Murr, Plenum Press, New York (1981), pp. 675–702. Described in the above reference are the effects of laser shock processing on fatigue of welded aluminum specimens that had used a series of overlapping spots to cover the weld and heat-affected zones. Significant increases in fatigue life were observed for these specimens indicating that overlapping the spots did not significantly reduce the effects of laser shocking. This is supported by results on a low carbon steel that showed no change in the compressive residual stress profile across the edge of a spot in a spot-overlap region.

For a more thorough background in the prior history of laser shock processing and that of high power processing of engineered materials, reference can be made to U.S. Pat. No. 5,131,957, such patent explicitly hereby incorporated by reference. This patent also shows a type of laser and laser circuit adaptable for use with the present invention. Another type of laser adaptable for use with the invention is that of a Nd:Glass Laser manufactured by LSP Technologies, Inc. of Dublin, Ohio.

Overlays are applied to the surface of the target workpiece being laser shock processed. These overlay materials may be of two types, one transparent to laser radiation and the other opaque to laser radiation. They may be used either alone or in combination with each other, but it is preferred that they be used in combination with the opaque overlay adjacent the workpiece, and the outer transparent overlay being adjacent the opaque overlay.

The transparent overlay material should be substantially transparent to the radiation. Useful transparent overlay materials include water, water-based solutions, other non-corrosive liquids, glass, quartz, sodium silicate, fused silica, potassium chloride, sodium chloride, polyethylene, fluoroplastics, nitrocellulose, and mixtures thereof. Fluoroplastics, as they are known by ASTM nomenclature, are parallinic hydrocarbon polymers in which all or part of each hydrogen atom has been replaced with a fluorine atom. Another halogen, chlorine, can also be part of the structure of a fluoroplastic. By order of decreasing fluorine substitution and increasing process ability, these materials include polytetrafluoroethylene (PTFE); fluorinated ethylene propylene (FEP): the chlorotrifluorethylenes (CTFE); and polyvinylidine fluoride (PVF.sub.2). Also available is a variety of copolymers of both halogenated and fluorinated hydrocarbons, including fluorinated elastomers. Additionally, the transparent overlay could be a gel or a strip of tape comprised of one or more of the above materials.

Where desired, the opaque overlay material may be substantially opaque to the radiation. Useful opaque overlay materials of the present invention include an energy-absorbing dispersant and a base material. The dispersant may, for example, be graphite, carbon black, black iron oxide ($Fe_2O_3$), and/or mixtures of these materials. The base material for such opaque overlay materials is advantageously an oil (e.g., mineral, vegetable, petroleum-derived) which contributes to the viscosity control, adherence, and drying resistance needed by the opaque overlay material of the present invention. The mixture of the dispersant and base material is colloidal in nature, in the sense that the dispersant is too fine to be filtered readily from the base material and is resistant to settling. A typical overlay is about 10 to 20,000 micrometers (μm) thick. In an advantageous embodiment of the invention, an oil-and-graphite mixture is used to give superior results both in terms of energy absorption during shock processing and reuse thereafter.

Figure 2:
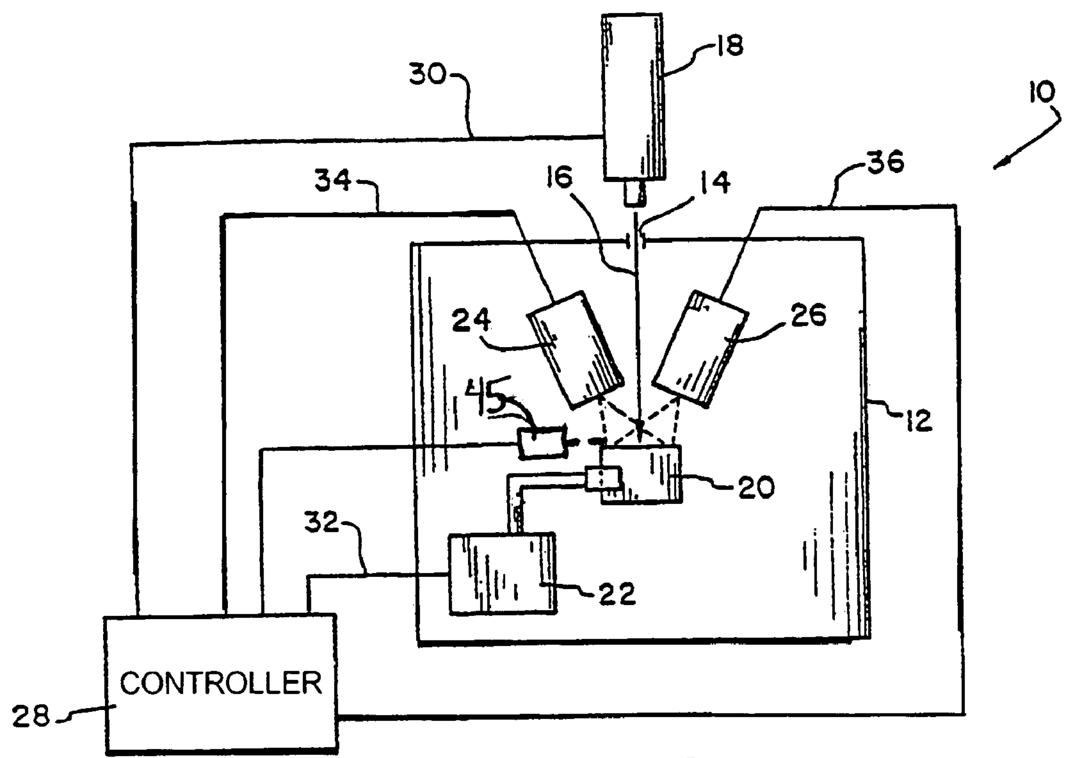
FIG. 2 is a diagrammatic view of one embodiment of the present invention.

Referring now to the drawings and particularly to FIG. 2, there is shown a preferred embodiment 10 of the present invention including a target chamber 12 in which the laser shock process takes place. The target chamber 12 includes an opening 14 for a laser beam 16 created by laser 18, a source of coherent energy. Laser 18, by way of example, may be a commercially available high power pulse laser system capable of delivering more than approximately 40 joules in 5 to 100 nanoseconds. The laser pulse length and focus of the laser beam may be adjusted as known in the art.

Shown in FIG. 2, a workpiece 20 is held in position within target chamber 12 by means of a positioning mechanism 22. Positioning mechanism 22 may be of the type of a robotically controlled arm or other apparatus to precisely position workpiece 20 relative to the operational elements of laser shock system 10.

System 10 includes a material applicator 24 for applying an energy-absorbing material onto workpiece 20 to create a coated portion. Material applicator 24 may be that of a solenoid operated painting station or other construction such as a jet spray or aerosol unit to provide a small coated area onto workpiece 20. The material utilized by material applicator 24 is preferably an energy-absorbing material that is resistant to erosion or dissolution by the water overlay and resistant to drying, or an energy-absorbing material that is self-limiting in thickness yet adherent and resistant to drying. In addition, the opaque overlay may advantageously be resistant to ignition by the plasma plume. Each such material advantageously is composed of an oil and graphite mixture. Various features of the oil/graphite mixture such as the graphite particle size, graphite concentration, oil composition, and additive usage can be adjusted to produce the desired set of material characteristics. Alternatively, other types of opaque coatings may be used that incorporate those materials discussed above.

With respect to the energy-absorbing material that exhibits its self-limiting coating thickness, the oil-based nature of the colloidal graphite coating exhibits a tendency to limit the coating build-up during spray application. The coating wets the surface of parts well and, due to its relatively low viscosity, it spreads out rather uniformly when deposited on a given surface. Like the viscous version of the energy-absorbing material, the self-limiting coating thickness composition does not dry during application, so it is less susceptible to clumping, clogging, or similar spray problems encountered with water-based paints that have been previously evaluated.

As the oil-based coating of this embodiment is sprayed, it readily displaces laterally, and the coating thickness at the spot where the laser beam will be applied reaches a self-limiting maximum. Overspray of the coating simply displaces sideways and does not affect the laser peening operation. As such, the self-limiting nature of this coating embodiment provides improved uniformity to the coating thickness, which theoretically should improve the uniformity of the shockwave created at the surface during laser peening. Further, the spreading characteristic of the coating makes control of the coating thickness much less critical than when using coatings, which are susceptible to over-spray irregularities.

The non-drying nature of the oil-based colloidal graphite coating (both the viscous and self-limiting thickness compositions) offers an opportunity to pre-coat or pre-spray the part before laser peening. In some instances, this may reduce the amount of overlay coating that must be applied by material applicator 24 (which may be incorporated into a RapidCoater™ system (not shown).

Using this approach, the part is pre-coated, and material applicator 24 can be used just to "touch up" the spot to be laser peened. This procedure can reduce the coating spray cycle time in the processing cell and potentially increase productivity in situations where the coating application cycle time is the time-limiting parameter. This methodology can also be used to minimize the amount of spraying in the work cell, which can reduce overspray on the workpiece and potential contamination of objects associated with the process system. Furthermore, pre-coating the part will also lessen the chances of applying a laser beam pulse to an uncoated area, which can result in melting, "burning", and/or "staining" of the surface.

System 10 further includes a transparent overlay applicator 26 that applies a fluid or liquid transparent overlay to workpiece 10 over the portion coated by material applicator 24. Transparent overlay material should be substantially transparent to the radiation as discussed above, water being the preferred overlay material.

As shown in FIG. 2, both material applicator 24 and transparent overlay material applicator 26 are shown directly located within target chamber 12. In a production operation environment, only the necessary operative portions need be located through and within target chamber 12 such as the portion through which the materials actually flow through a flow head. The supply tanks for the transparent overlay materials and other energy-absorbing materials may be located outside of target chamber 12.

Figure 3:
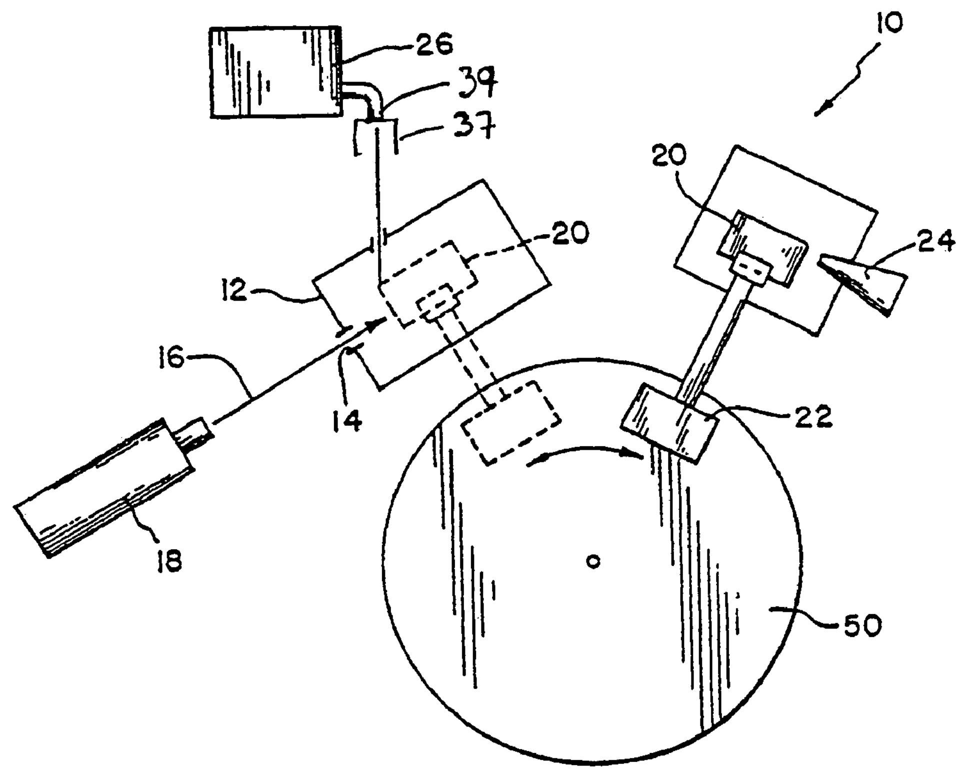
FIG. 3 is a diagrammatic view of another form of the present invention utilizing a rotatable carousel to index a workpiece.

Both material applicator 24 and transparent overlay material applicator 26 can each be fitted with an integral protector 37 schematically indicated in FIG. 3. Each protector 37 extends beyond a respective spray nozzle 39 of the particular one of material applicator 24 and overlay material applicator 26. Such protectors 37 are attached to the robotically-positionable coating system fixturing (not labeled). Thus, the shielding protector 37 accompanies a given nozzle 39, and manual application of protectors to the workpiece and/or specific portions of the process apparatus can be obviated. Protectors 37 may be made of any suitable material, such as polyethylene, Lexan™, or other plastics. Metal protectors can be used, but plastics are typically preferred to minimize the potential for scratching parts during processing or movement of applicators 24 and 26 and such or other portions of the RapidCoater™ System.

A control unit, such as controller 28, is operatively associated with each of the material applicator 24, transparent overlay material applicator 26, laser 18 and positioning mechanism 22. Controller 28 controls the operation and timing of each of the applicators 24, 26, laser 18 and selective operation of positioning mechanism 22 to ensure proper sequence and timing of system 10. Shown in FIG. 2, controller 28 is connected to laser 18, positioning mechanism 22, material applicator 24 and transparent overlay material applicator 26 via control lines 30, 32, 34 and 36, respectively. Controller 28, in one embodiment, may be a programmed personal computer or microprocessor.

In operation, controller 28 controls operation of system 10 once initiated. As shown in FIG. 1, the method of the invention is that first, workpiece 20 is located (38) particularly within targeting chamber 12 by positioning mechanism 22. Controller 28 activates material applicator 24 to apply a laser energy-absorbing coating 40 onto a particular location of workpiece 20 to be laser shock processed. The next step of the process is that controller 28 causes transparent overlay material applicator 26 to apply transparent overlay 42 to the previously coated portion of workpiece 20. At this point, laser 18 is immediately fired by controller 28 to initiate a laser beam 16 to impact the coated portion 44. Preferably, the time between applying the transparent water overlay and the step of directing the laser energy pulse is approximately 0.1 to 3.0 seconds. By directing this pulse of coherent energy to the coated portion, a shockwave is created. As the plasma expands from the impact area, it creates a compressional shockwave passing through and against workpiece 20.

As part of the laser peening system to be employed, it is advantageous to provide a detection/monitoring unit 45 which can be used to ensure that the overlay coatings for each spot during each cycle have been appropriately applied and that the laser beam has been applied to the part before moving on to the next spot. Detection/monitoring unit 45 may be any one of a mass/flow meter, a video monitoring unit, a plasma monitor, and an acoustic monitor. Mass/flow meters may be provided on the coating and water supply lines to applicators 24 and 26, respectively. Digital outputs from the meters may be monitored with controller 28. In the basic form thereof, a pulse from the meters can be used to verify application of an overlay through a system of spray nozzles 39 or to signal an alarm condition if no flow is registered. With more sophisticated meters, a quantitative measure of the amount of the overlay coating can may be registered and recorded. Other sensors for detecting the presence of the overlay coating may also be used, such as ultrasonic flow/motion detectors or interrupted optical signals.

Another alternative for detection/monitoring unit 45 is a video monitor. With such a video monitor, the spray pulse from the system nozzles 39 may be observed with video monitors focused at locations showing the nozzles 39 positioned to spray the part. Image analysis can be used in real time during the spray cycle to verify the application and the spot location. In the case of graphite, oil-based coatings, the spray pattern may be difficult to observe with a video monitor because of the dark colors of the coating and the substrate.

As a yet further alternative for detection/monitoring unit 45, a plasma monitor can be used which can verify application of the coating overlays. For example, the flash of the plasma during the application of the laser beam has a characteristic signature that can be analyzed in real time. This characteristic signature can be used to determine if water overlay coating was in place as the laser pulse was applied.

As a yet further alternative, one or more acoustic monitors can be used for detection/monitoring unit 45. The presence of the overlay coatings can be verified using acoustic monitors such as a pinducer. During proper processing, the application of the laser pulse produces a loud snap (typically >130 dB). If the overlay coatings are not present or the laser pulse misses the part, the acoustic signature is not present, is altered, or is greatly diminished. Thus, a minimum sound loudness threshold can be monitored, recorded, and used as a means of indicating that each spot was processed properly with the overlay coatings in place.

During plasma formation due to laser impact, a first portion of the laser energy-absorbing coated portion 44 is sacrificed, e.g., converted to plasma or driven off workpiece 20. A second, unsacrificed portion thereof is prevented from escaping by transparent overlay 42 but, due to its characteristic viscosity, instead is fluidly displaced laterally along workpiece 20 away from the impact/impingement point of laser beam 16. An advantageous by-product of this displacement is that an unspent/unsacrificed portion of the energy-absorbing overlay 44 can be fluidly displaced into one or more adjacent potential treatment locations on workpiece 20 or recovered for reuse (i.e., Reuse/Recycle Step 46). That the improved oil-based energy-absorbing overlay 44 spreads well, is readily fluidly displaced, and is self-limiting in thickness can effectively reduce or eliminate the need for further laser energy-absorbing coating 40 to be deposited onto such a potential treatment location. A detection/monitoring unit 45 (which may be a direct (i.e., contact) or indirect (i.e., photo) unit as appropriate) is provided for measuring the thickness of the coated portion 44 at a treatment location in order to determine if more laser energy-absorbing coating 40 (i.e., a touch-up application thereof) need be applied thereto prior to firing of laser 18. Using this approach of maximizing the applied energy-absorbing overlay 44 can result in reduced coating cycle times and thereby result in increased productivity in cases where coating application cycle times is the rate-limiting portion of the laser peening process.

With the use of the improved oil-based overlay coating compositions of the present invention, a step of cleaning a laser-peened spot with an air/water blast to remove the paint and to prepare for the next laser peening system cycle may be performed or omitted, as desired. Because of the improved nature of the overlay coatings of the present invention, it is not always necessary to remove the coating between overlay spray cycles. This is especially true when the self-limiting thickness composition is employed. A touch-up of the overlay coating can be adequate to replenish the overlay coating layer sufficiently to promote burning and to generate the shockwave. Using this approach, the overall cycle time for the laser peening process can be reduced, and productivity can be increased in cases where the coating cycle time is the time-limiting process step during laser peening.

In the case where the overlay coating is not removed during processing, the part may be cleaned after laser peening has been completed using various spray cleaning techniques such as a high-pressure cleaning system or cleaning systems analogous to dishwasher cleaning. Removal of the oil-based overlay coating may be facilitated with the use of hot water and a detergent (preferably non-foaming). The removed coating is advantageously immiscible with water and may be skimmed or separated readily from the waste water for disposal or recycling.

If it is desired to use the RapidCoater™ System with the graphite/oil-based overlay and to remove the coating at each spot during a given system cycle, the air/water blast portion of the cycle may be used. It is advantageous to use hot water and a non-foaming detergent to facilitate the removal of the overlay coating. Many suitable detergents are available, one such non-foaming detergent being AP-12 available from EMD Chemicals, Inc.

The above-described process or portions of the process are repeated to shock process the desired surface area of workpiece 20. Depending upon the energy levels and the amount of laser shocking desired on workpiece 20, controller 28 may position or re-index workpiece 20 into another position using positioning mechanism 22 so that system 10 may apply coatings to and laser beam 12 may impact a different portion which may overlap the previously impact area.

It may be advantageous in a production environment to separate the coating operation from the lasing operation. FIG. 3 discloses another way to reposition and re-index a workpiece 20 using a selectively rotatable carousel 50. Positioning mechanism 22 is located on carousel 50 for rotation therewith. Controller 28 will control both the operation of positioning mechanism 22 and the location of the mechanism by selectively rotating carousel 50 to position a workpiece adjacent either material applicator 24 or transparent overlay material applicator 26. If necessary, additional workstations may be utilized but these may reduce the process efficiency.

In one form of the invention, it may be possible such that all the steps of the process shown in FIG. 1 may be accomplished without moving the workpiece 20. Workpiece 20 may be indexed if necessary to cover large areas by the process. By not moving workpiece 20, additional manufacturing efficiencies are produced while additionally reducing the time between steps. The limiting factor in the process currently is the cycle time of laser 18. Laser 18 may be fired about every 0.5 seconds to 10 seconds. This minimum amount of time is required by laser 18 to recharge while permitting selected other steps of the process shown in FIG. 1 to be accomplished.

In another form of the invention, controller 28 can be a smart control unit advantageously interfaced with the RapidCoater™ System. This interface promotes the parameters and timing of the coating system to be set remotely by the operator. Potentially, the settings can be varied spot-by-spot using a program sequence. Movement of the part and the laser peening system robots (not labeled) can be coordinated for optimal processing. Detection/monitoring unit(s) 45 used to validate the application of the overlay coatings and/or the laser spot can be interfaced to controller 28, which is specifically designed to be a smart controller as part of this embodiment. Using this approach, processing can be verified for each spot before proceeding to the next. This verification system is much more efficient than re-positioning to rework various spots after the primary processing is completed.

In alternative embodiments, the application of transparent overlay material (shown in step 42) may comprise of applying the transparent overlay material continuously before and during the directing of the laser energy pulse.

Depending upon the workpiece material, many parameters of the present invention may be selected to control the shock process. For example, the operator controller may select a particular laser pulse energy, laser pulse time, number of laser pulses, focal lens, working distance, thickness of both the energy-absorbing coating and transparent overlay to control the laser shock process. More particularly, laser pulse energy and laser pulse width directly affect this cycle. The amount of energy placed on the surface of the workpiece and number of laser pulses affects the depth of each shock and the speed of the shocking process. It has been found that the energy of the laser pulse, as well as other parameters should be controlled in order to prevent surface melting of the workpiece.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of treating a workpiece by applying shockwaves thereto, comprising the steps of:
   - applying an energy-absorbing overlay to a portion of a surface of the workpiece, said energy-absorbing overlay being composed of a liquid material resistant to dissolution by the transparent water overlay and resistant to drying;
   - applying a transparent overlay upon said energy-absorbing overlay; and
   - directing a pulse of coherent energy to said energy-absorbing overlay, said pulse of coherent energy being absorbed at least in part by said liquid material and causing a portion of said energy-absorbing overlay to vaporize and thereby generate at least one shockwave for transmission to the workpiece.

2. The method of claim 1, wherein said liquid erosion-resistant and drying-resistant material has a combined viscosity and level of adherence such that said energy-absorbing overlay made thereof tends to conform and adhere to the workpiece under substantially static conditions yet is capable of fluid displacement when subjected to at least one shockwave.

3. The method of claim 1, wherein said liquid erosion-resistant and drying-resistant material is a colloidal substance having at least one energy-absorbing particulate dispersed therein.

4. The method of claim 3, wherein said colloidal substance is a mixture of an oil and graphite.

5. The method of claim 3 wherein said colloidal substance is a mixture of oil and black iron oxide ($Fe_2O_3$).

6. The method of claim 3 wherein said colloidal substance is a mixture of oil, colloidal graphite and black iron oxide ($Fe_2O_3$).

7. The method of claim 1, wherein said energy-absorbing overlay has a viscosity of a magnitude that permits said energy-absorbing overlay to conform with a surface of the workpiece under substantially static conditions and yet to be fluidly displaced when subjected to sufficiently dynamic conditions.

8. The method of claim 7, wherein the sufficiently dynamic conditions occur during at least one of said applying an energy-absorbing overlay step and said directing a pulse step.

9. The method of claim 1, wherein said energy-absorbing overlay includes at least a first overlay portion and a second overlay portion, said first overlay portion being sacrificed upon impact of the pulse of coherent energy, said second overlay portion being reusable for a subsequent shockwave creation.

10. The method of claim 9, wherein the second overlay portion is fluidly displaced laterally along the workpiece surface, away from an impingement point of the pulse of coherent energy, an amount of the second overlay portion being displaced into an other proximate treatment location upon the workpiece.

11. The method of claim 10, comprising the further steps of:
   - applying a transparent overlay on the amount of the second overlay portion displaced into the other proximate treatment location; and
   - directing a pulse of coherent energy through the transparent overlay to the amount of the second overlay portion displaced into the other proximate location to effect a shockwave formation thereat.

12. The method of claim 11, further comprising the steps of:
   - monitoring the amount of the second overlay portion displaced into the other proximate treatment location, said monitoring thereof being performed prior to the step of applying the transparent overlay thereto; and
   - adjusting a total thickness of the energy-absorbing overlay existing at the other proximate treatment location to thereby conform with a desired thickness therefor.

13. The method of claim 1, further comprising the step of reclaiming any remaining amount of said energy-absorbing overlay.

14. The method of claim 1, wherein the coherent energy is in a form of laser energy.

15. A method of treating a workpiece by applying shockwaves thereto, comprising the steps of:
   - applying an energy-absorbing overlay to a portion of a surface of the workpiece, said energy-absorbing overlay being composed of an adherent, uniformly spreading liquid material, said adherent, uniformly spreading liquid material being resistant to drying;
   - applying a transparent overlay upon said energy-absorbing overlay; and
   - directing a pulse of coherent energy to said energy-absorbing overlay, said pulse of coherent energy being absorbed at least in part by said liquid material and causing a portion of said energy-absorbing overlay to vaporize and thereby generate at least one shockwave for transmission to the workpiece.

16. The method of claim 15, wherein said adherent, uniformly spreading liquid material displaces easily enough laterally when sprayed so as to thereby reach a coating thickness having a self-limiting maximum.

17. The method of claim 15, further comprising the step of:
   - one of pre-coating and pre-spraying the workpiece with another adherent, uniformly spreading liquid material prior to said step of applying said energy-absorbing overlay, said another adherent, uniformly spreading liquid material being resistant to drying.

18. The method of claim 17, wherein said step of applying said energy-absorbing overlay includes supplying said adherent, uniformly spreading liquid material at locations where it is needed and one of lacking and supplied at an insufficient thickness.

19. The method of claim 15, further comprising the step of:
   - cleaning the workpiece after the treating of the workpiece by applying shockwaves thereto, said step of cleaning the workpiece being a spray cleaning technique.

20. The method of claim 15, wherein a plurality of spots are treated during the treating of the workpiece, said energy-absorbing overlay being applied to each of said spots individually, said method further comprising the step of:
   - removing said energy-absorbing overlay from each said spot after performing the step of directing the pulse of said coherent energy upon said each said spot.

21. The method of claim 15, further comprising the step of:
   - using an automated means for ensuring at least one of that a correct amount of said energy-absorbing overlay has been applied at a given treatment spot and that the laser beam has been applied at the given treatment spot prior to a next treatment step being performed.

22. The method of claim 21, wherein said automated means is configured for measuring an applied amount of said energy-absorbing overlay, said automated means being one of a mass/flow meter, a video monitor, a plasma monitor, and an acoustic monitor.

23. The method of claim 15, wherein at least one first spray nozzle is used for applying said energy-absorbing overlay, at least one second spray nozzle being used for applying said transparent overlay, each said first spray nozzle and each said second spray nozzle having a protector fitted therewith, each said protector being configured for shielding a segment of the workpiece from potential damage from a coating material being ejected through a given said spray nozzle.

24. The method of claim 15, wherein said drying-resistant liquid material is a colloidal substance having at least one energy-absorbing particulate dispersed therein.

25. The method of claim 24 wherein said colloidal substance is a mixture of oil and black iron oxide ($Fe_2O_3$).

26. The method of claim 24 wherein said colloidal substance is a mixture of oil, colloidal graphite and black iron oxide ($Fe_2O_3$).

27. The method of claim 15, further comprising the step of reclaiming any remaining amount of said energy-absorbing overlay.

* * * * *